(12) United States Patent
Atsumi et al.

(10) Patent No.: US 11,499,435 B2
(45) Date of Patent: Nov. 15, 2022

(54) GAS TURBINE STATOR VANE, GAS TURBINE PROVIDED WITH SAME, AND METHOD OF MANUFACTURING GAS TURBINE STATOR VANE

(71) Applicant: Mitsubishi Power, Ltd., Kanagawa (JP)

(72) Inventors: Hidekatsu Atsumi, Yokohama (JP); Hidemichi Koyabu, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 99 days.

(21) Appl. No.: 17/279,403

(22) PCT Filed: Oct. 4, 2019

(86) PCT No.: PCT/JP2019/039287
§ 371 (c)(1),
(2) Date: Mar. 24, 2021

(87) PCT Pub. No.: WO2020/080142
PCT Pub. Date: Apr. 23, 2020

(65) Prior Publication Data
US 2022/0003124 A1    Jan. 6, 2022

(30) Foreign Application Priority Data

Oct. 18, 2018    (JP) .............................. JP2018-197053

(51) Int. Cl.
*F01D 5/18* (2006.01)
*F01D 9/04* (2006.01)
*F01D 25/12* (2006.01)

(52) U.S. Cl.
CPC ............. *F01D 5/187* (2013.01); *F01D 9/041* (2013.01); *F01D 25/12* (2013.01);
(Continued)

(58) Field of Classification Search
CPC ... F01D 9/02; F01D 9/04; F01D 9/041; F01D 25/12; F01D 5/18; F01D 5/187;
(Continued)

(56) References Cited

U.S. PATENT DOCUMENTS 6,146,091 A * 11/2000 Watanabe ............... F01D 11/10
                                                        415/111
6,205,789 B1 * 3/2001 Patterson .................. F23R 3/06
                                                        60/754
(Continued)

FOREIGN PATENT DOCUMENTS

CN  107503801 A  * 12/2017
EP  2436884 A1  * 4/2012  ............... F01D 5/30
(Continued)

OTHER PUBLICATIONS

International Search Report dated Nov. 19, 2019 in International (PCT) Application No. PCT/JP2019/039287, with English translation.

(Continued)

*Primary Examiner* — Mark A Laurenzi
*Assistant Examiner* — Xiaoting Hu
(74) *Attorney, Agent, or Firm* — Wenderoth, Lind & Ponack, LLP

(57) ABSTRACT

A stator vane includes a blade body, an outer shroud, and an impingement plate. The outer shroud includes a recess. The impingement plate forms a cavity inside the recess. A communication hole is provided in the impingement plate and the outer shroud. In the impingement plate, a plurality of through holes through which an outer space and a cavity communicate with each other are formed. A second region in which an opening ratio is large and a first region in which an opening ratio is small exist in a surface of the impingement plate.

15 Claims, 13 Drawing Sheets

(52) U.S. Cl.
CPC ...... *F05D 2220/32* (2013.01); *F05D 2230/60* (2013.01); *F05D 2240/12* (2013.01); *F05D 2240/81* (2013.01); *F05D 2260/201* (2013.01)

(58) Field of Classification Search
CPC ...... F01D 5/188; F01D 5/189; F05D 2240/12; F05D 2240/81; F05D 2260/20; F05D 2260/201
See application file for complete search history.

(56) References Cited

U.S. PATENT DOCUMENTS

| | | | |
|---|---|---|---|
| 6,425,241 B1 | 7/2002 | Jones et al. | |
| 6,513,331 B1* | 2/2003 | Brown | F23R 3/06 60/754 |
| 7,614,235 B2* | 11/2009 | Burd | F23R 3/002 60/754 |
| 9,719,362 B2* | 8/2017 | Rana | F01D 9/065 |
| 2002/0195479 A1* | 12/2002 | Benedetti | B23K 1/0018 228/259 |
| 2005/0111965 A1* | 5/2005 | Lowe | F01D 9/04 415/116 |
| 2007/0245742 A1* | 10/2007 | Dahlke | F23R 3/005 60/754 |
| 2008/0193278 A1* | 8/2008 | Erickson | F01D 25/12 415/115 |
| 2011/0217159 A1* | 9/2011 | McMahan | F01D 25/08 415/115 |
| 2012/0020768 A1* | 1/2012 | Krueckels | F01D 25/12 415/177 |
| 2012/0063891 A1* | 3/2012 | Kruckels | F01D 5/187 415/178 |
| 2013/0028705 A1* | 1/2013 | Lagueux | F01D 11/24 415/146 |
| 2013/0177396 A1* | 7/2013 | Winn | F01D 25/08 165/177 |
| 2014/0294560 A1* | 10/2014 | Mishra | F01D 11/24 415/115 |
| 2015/0354826 A1* | 12/2015 | Rüdel | F23R 3/002 60/798 |
| 2016/0169026 A1* | 6/2016 | Jones | F01D 5/12 415/1 |
| 2018/0045056 A1* | 2/2018 | Wiedenhoefer | F02C 3/04 |
| 2019/0330986 A1* | 10/2019 | Anderson | F01D 5/188 |
| 2019/0330987 A1* | 10/2019 | Anderson | F01D 5/188 |
| 2020/0131932 A1* | 4/2020 | Sezer | F01D 25/14 |
| 2020/0141271 A1* | 5/2020 | Waite | F01D 25/12 |
| 2020/0190989 A1* | 6/2020 | Fujii | F01D 5/188 |

FOREIGN PATENT DOCUMENTS

| | | |
|---|---|---|
| JP | 2000-274686 | 10/2000 |
| JP | 2001-90504 | 4/2001 |
| JP | 2001-214706 | 8/2001 |
| JP | 2003-120207 | 4/2003 |
| JP | 2009-243429 | 10/2009 |

OTHER PUBLICATIONS

Written Opinion of the International Searching Authority dated Nov. 19, 2019 in International (PCT) Application No. PCT/JP2019/039287, with English translation.

* cited by examiner

GAS TURBINE STATOR VANE, GAS TURBINE PROVIDED WITH SAME, AND METHOD OF MANUFACTURING GAS TURBINE STATOR VANE

TECHNICAL FIELD

The present invention relates to a gas turbine stator vane, a gas turbine provided with the same, and a method of manufacturing a gas turbine stator vane.

Priority is claimed on Japanese Patent Application No. 2018-197053, filed Oct. 18, 2018, the content of which is incorporated herein by reference.

BACKGROUND ART

A gas turbine includes a rotor that rotates about an axis and a casing that covers the rotor. The rotor has a rotor shaft and a plurality of rotor blades attached to the rotor shaft. In addition, a plurality of stator vanes are provided inside the casing.

The stator vane has a blade body that extends in a radial direction with respect to the axis to form a blade profile, an inner shroud provided on a radially inner side of the blade body, and an outer shroud provided on a radially outer side of the blade body.

The stator vane of the gas turbine is exposed to a hot combustion gas. Therefore, in general, the stator vane is cooled by air or the like.

For example, a stator vane described in Patent Literature 1 below has a cooling system for a stator vane which is applied to a gas turbine. Specifically, in a blade body of the stator vane, a flow path through which a cooling medium flows is formed. Further, the outer shroud has a recessed portion that is recessed toward a radially inner side and opens toward a radially outer side. Further, an impingement plate is provided to cover the recessed portion, and a cavity is formed between the impingement portion and the recessed portion. A through hole through which the cooling medium flows is provided in a surface of the impingement plate. Further, the outer shroud has a pipe-shaped protrusion that protrudes from a bottom surface of the recessed portion. In the pipe-shaped protrusion, a through hole that penetrates the pipe-shaped protrusion in the radial direction is formed. A probe for inspection is inserted into this through hole.

In this stator vane, the pipe-shaped protrusion is formed as part of the outer shroud to improve the sealing performance of the cooling medium flowing through the cavity.

CITATION LIST

Patent Literature

[Patent Literature 1]
Japanese Unexamined Patent Application, First Publication No. 2003-120207

SUMMARY OF INVENTION

Technical Problem

In the stator vane of the gas turbine, it is desirable to improve durability while enabling inspection with an inspection probe or the like.

An object of the present invention is to provide a turbine stator vane in which it is possible to improve durability while enabling inspection with an inspection probe or the like, a gas turbine provided with the same, and a method of manufacturing a gas turbine stator vane.

Solution to Problem

A gas turbine stator vane of an aspect according to the invention for achieving the above object includes a blade body forming a blade profile, a shroud provided on a first side out of the first side and a second side of the blade body in a blade height direction, and an impingement plate that forms a cavity with the shroud. The shroud has a recess which is recessed toward the second side and the recess of which the first side opens. The impingement plate is provided in an opening of the recess to form the cavity inside the recess. In the impingement plate, a plurality of through holes which penetrate the impingement plate in the blade height direction and through which an outer space that is a space on the first side and the cavity with the impingement plate as a reference communicate with each other are formed. In the impingement plate and the shroud, a communication hole which penetrates the impingement plate and the shroud in the blade height direction and through which an inner space that is a space on the second side and the outer space with the shroud as a reference communicate with each other is formed. A first region in which an opening ratio that is an opening area of the plurality of through holes per unit area is small and a second region in which the opening ratio is large exist in a surface of the impingement plate. In the impingement plate, the second region is formed on a periphery of an opening of the communication hole in the impingement plate.

According to the present aspect, even if the communication hole for inserting an inspection device such as a probe is provided in the impingement plate, it is possible to suppress a decrease in cooling efficiency of the shroud by providing the second region having a large opening ratio due to the through holes.

Further, according to the present aspect, by providing the second region on the periphery of the opening where the communication hole for inserting the inspection device is provided, it is possible to efficiently cool the periphery of the communication hole.

In the gas turbine stator vane according to any one of the above aspects, the number of the through holes included in the second region per unit area may be larger than the number of the plurality of through holes included in the first region per unit area.

According to the present aspect, the number of the through holes per unit area in the second region is made larger than that in the first region, and thus the opening ratio in the second region becomes higher than the opening ratio in the first region, and it is possible to suppress a decrease in cooling efficiency of the shroud.

In the gas turbine stator vane according to any one of the above aspects, inner diameters of the plurality of through holes included in the second region may be larger than inner diameters of the plurality of through holes included in the first region.

According to the present aspect, since the inner diameters of the through holes included in the second region is formed to be larger than the inner diameters of the through holes included in the first region, in a case in which the number of the through holes to be disposed is limited, it is possible to suppress a decrease in cooling efficiency of the shroud without increasing the number of through holes.

A gas turbine stator vane of another aspect according to the invention for achieving the above object includes a blade body forming a blade profile, a shroud provided on a first side out of the first side and a second side of the blade body in a blade height direction, and an impingement plate that forms a cavity with the shroud. The shroud has a recess which is recessed toward the second side and the recess of which the first side opens. The impingement plate is provided in an opening of the recess to form the cavity inside the recess. In the impingement plate, a plurality of through holes which penetrate the impingement plate in the blade height direction and through which an outer space that is a space on the first side and the cavity with the impingement plate as a reference communicate with each other are formed. In the impingement plate and the shroud, a communication hole which penetrates the impingement plate and the shroud in the blade height direction and through which an inner space that is a space on the second side and the outer space with the shroud as a reference communicate with each other is formed. A first region in which an opening ratio that is an opening area of the plurality of through holes per unit area is small and a second region in which the opening ratio is larger than that in the first region exist in a surface of the impingement plate. Inner diameters of the plurality of through holes included in the second region are larger than inner diameters of the plurality of through holes included in the first region. A distance between opening centers of two adjacent through holes in the first region is the same as a distance between opening centers of two adjacent through holes in the second region.

According to the present aspect, since the distance between the opening centers of the two adjacent through holes in the first region is made the same as the distance between the opening centers of the two adjacent through holes in the second region, instructions for sending machining instructions is simplified, and workability can be improved.

In the gas turbine stator vane according to any one of the above aspects, the shroud may have a tubular portion that extends from a bottom surface of the recess toward the first side, an end of the tubular portion on the first side is connected to the impingement plate, and an internal space of the tubular portion may form part of an internal space of the communication hole.

A gas turbine of an aspect according to the invention for achieving the above object includes the gas turbine stator vanes according to any one of the above aspects, a rotor that is configured to rotate about an axis, a casing that covers an outer peripheral side of the rotor, and a combustor that is configured to burn fuel to generate a combustion gas and send the combustion gas to the casing. The gas turbine stator vane is fixed to the casing in the casing such that the blade height direction faces in a radial direction with respect to the axis and the first side is a radially outer side with respect to the axis.

A gas turbine of another aspect according to the invention for achieving the above object includes a plurality of gas turbine stator vanes, a rotor that is configured to rotate about an axis, a casing that covers an outer peripheral side of the rotor, and a combustor that is configured to burn fuel to generate a combustion gas and send the combustion gas to the casing. Each of the plurality of gas turbine stator vanes has a blade body forming a blade profile, a shroud provided on a first side out of the first side and a second side of the blade body in a blade height direction, and an impingement plate that forms a cavity with the shroud. The plurality of gas turbine stator vanes are arranged in a circumferential direction with respect to the axis, and each of the plurality of gas turbine stator vanes is fixed to the casing inside the casing such that the blade height direction faces in a radial direction with respect to the axis and the first side is a radially outer side with respect to the axis. Out of two adjacent gas turbine stator vanes in the circumferential direction, a first gas turbine stator vane which is one gas turbine stator vane is the gas turbine stator vane according to any one of the above aspects. Out of the two gas turbine stator vanes, a second shroud which is the shroud of a second gas turbine stator vane which is the other gas turbine stator vane has a second recess which is recessed toward a radially inner side with respect to the axis and the second recess of which a radially outer side with respect to the axis opens. A second impingement plate which is the impingement plate of the second gas turbine stator vane is provided in an opening of the second recess to form a second cavity which is the cavity inside the second recess. In the second impingement plate, a plurality of through holes which penetrate the second impingement plate in the blade height direction and through which an outer space that is a space on the first side and the second cavity with the second impingement plate as a reference communicate with each other are formed. In the second impingement plate and the second shroud, the communication hole of the first gas turbine stator vane is not formed.

A gas turbine of still another aspect according to the invention for achieving the above object includes a plurality of gas turbine stator vanes, a rotor that is configured to rotate about an axis, a casing that covers an outer peripheral side of the rotor, and a combustor that is configured to burn fuel to generate a combustion gas and send the combustion gas to the casing. Each of the plurality of gas turbine stator vanes has a blade body forming a blade profile, a shroud provided on a first side out of the first side and a second side of the blade body in a blade height direction, and an impingement plate that forms a cavity with the shroud. The plurality of gas turbine stator vanes are arranged in a circumferential direction with respect to the axis. Each of the plurality of gas turbine stator vanes is fixed to the casing inside the casing such that the blade height direction faces in a radial direction with respect to the axis and the first side is a radially outer side with respect to the axis. Out of two adjacent gas turbine stator vanes in the circumferential direction, a first gas turbine stator vane which is one gas turbine stator vane is a gas turbine stator vane in which a first shroud which is the shroud has a first recess which is recessed toward the second side and the first recess of which the first side opens, a first impingement plate which is the impingement plate is provided in an opening of the first recess to form the cavity inside the first recess, in the first impingement plate, a plurality of through holes which penetrate the first impingement plate in the blade height direction and through which an outer space that is a space on the first side and the cavity with the first impingement plate as a reference communicate with each other are formed, in the first impingement plate and the first shroud, a communication hole which penetrates the first impingement plate and the first shroud in the blade height direction and through which an inner space that is a space on the second side and the outer space with the first shroud as a reference communicate with each other is formed, and a first region in which an opening ratio that is an opening area of the plurality of through holes per unit area is small and a second region in which the opening ratio is larger than that in the first region exist in a surface of the first impingement plate. Out of the two gas turbine stator vanes, a second gas turbine stator vane which is the other gas turbine stator vane is a gas turbine stator vane in which the second shroud which is the shroud of the second gas turbine stator vane is adjacent to the first shroud in the circumferential direction, a second shroud has a second recess which is recessed toward a radially inner side with respect to the axis, the second recess of which a radially outer side with respect to the axis opens, and the second recess which is adjacent to the first recess in the circumferential direction, a second impingement plate which is the impingement plate of the second gas turbine stator vane is provided in an opening of the second recess to form a second cavity which is the cavity inside the second recess, in the second impingement plate, a plurality of through holes which penetrate the second impingement plate in the blade height direction and through which an outer space that is a space on the first side and the second cavity with the second impingement plate as a reference communicate with each other are formed, in the second impingement plate and the second shroud, the communication hole of the first gas turbine stator vane is not formed, and in the second impingement plate, a region corresponding to the second region in the first gas turbine stator vane does not exist.

In a method of manufacturing a gas turbine stator vane of an aspect according to the invention for achieving the above object, a blade main body designing step of designing a blade main body that has a blade body forming a blade profile and a shroud provided on a first side out of the first side and a second side of the blade body in a blade height direction, an impingement plate designing step of designing an impingement plate that forms a cavity with the shroud, a manufacturing step of manufacturing the blade main body designed in the blade main body designing step and the impingement plate designed in the impingement plate designing step, and an assembling step of assembling the impingement plate to the blade main body manufactured in the manufacturing step are executed. The shroud designed in the blade main body designing step has a recess which is recessed toward the second side and the recess of which the first side opens. The impingement plate designed in the impingement plate designing step is provided in an opening of the recess to form the cavity inside the recess. The impingement plate designing step includes a first disposition determining step of determining the disposition of a plurality of through holes which penetrate the impingement plate in the blade height direction and through which an outer space that is a space on the first side and the cavity with the impingement plate as a reference communicate with each other, and a second disposition determining step of determining the disposition of a communication hole which penetrates the impingement plate and the shroud in the blade height direction and through which an inner space that is a space on the second side and the outer space with the shroud as a reference communicate with each other. In the first disposition determining step, disposition of a plurality of first through holes which are the plurality of through holes included in a first region in a surface of the impingement plate is determined, disposition of a plurality of second through holes which are the plurality of through holes included in a second region in the surface of the impingement plate except for the first region is determined such that the number of the plurality of second through holes per unit area is larger than the number of the plurality of first through holes per unit area, and a periphery of an opening of the communication hole in the impingement plate is set as the second region.

Further, in a method of manufacturing a gas turbine stator vane of another aspect according to the invention for achieving the above object, a blade main body designing step of designing a blade main body that has a blade body forming a blade profile and a shroud provided on a first side out of the first side and a second side of the blade body in a blade height direction, an impingement plate designing step of designing an impingement plate that forms a cavity with the shroud, a manufacturing step of manufacturing the blade main body designed in the blade main body designing step and the impingement plate designed in the impingement plate designing step, and an assembling step of assembling the impingement plate to the blade main body manufactured in the manufacturing step are executed. The shroud designed in the blade main body designing step has a recess which is recessed toward the second side and the recess of which the first side opens. The impingement plate designed in the impingement plate designing step is provided in an opening of the recess to form the cavity inside the recess. The impingement plate designing step includes a first disposition determining step of determining the disposition of a plurality of through holes which penetrate the impingement plate in the blade height direction and through which an outer space that is a space on the first side and the cavity with the impingement plate as a reference communicate with each other, a second disposition determining step of determining the disposition of a communication hole which penetrates the impingement plate and the shroud in the blade height direction and through which an inner space that is a space on the second side and the outer space with the shroud as a reference communicate with each other, and an inner diameter determining step of determining inner diameters of a plurality of first through holes which are the plurality of through holes included in a first region in a surface of the impingement plate and determining inner diameters of a plurality of second through holes which are the plurality of through holes included in a second region in the surface of the impingement plate except for the first region such that the inner diameters of the plurality of second through holes are larger than the inner diameters of the plurality of first through holes. In the first disposition determining step, the second region is formed on a periphery of an opening of the communication hole in the impingement plate.

Further, in a method of manufacturing a gas turbine stator vane of still another aspect according to the invention for achieving the above object, a blade main body designing step of designing a blade main body that has a blade body forming a blade profile and a shroud provided on a first side out of the first side and a second side of the blade body in a blade height direction, an impingement plate designing step of designing an impingement plate that forms a cavity with the shroud, a manufacturing step of manufacturing the blade main body designed in the blade main body designing step and the impingement plate designed in the impingement plate designing step, and an assembling step of assembling the impingement plate to the blade main body manufactured in the manufacturing step are executed. The shroud designed in the blade main body designing step has a recess which is recessed toward the second side and the recess of which the first side opens. The impingement plate designed in the impingement plate designing step is provided in an opening of the recess to form the cavity inside the recess. The impingement plate designing step includes a first disposition determining step of determining the disposition of a plurality of through holes which penetrate the impingement plate in the blade height direction and through which an outer space that is a space on the first side and the cavity with the impingement plate as a reference communicate with each other, a second disposition determining step of determining the disposition of a communication hole which penetrates the impingement plate and the shroud in the blade height direction and through which an inner space that is a space on the second side and the outer space with the shroud as a reference communicate with each other, and an inner diameter determining step of determining inner diameters of a plurality of first through holes which are the plurality of through holes included in a first region in a surface of the impingement plate and determining inner diameters of a plurality of second through holes which are the plurality of through holes included in a second region in the surface of the impingement plate except for the first region such that the inner diameters of the plurality of second through holes are larger than the inner diameters of the plurality of first through holes. In the first disposition determining step, a distance between opening centers of two adjacent through holes in the first region is made the same as a distance between opening centers of two adjacent through holes in the second region.

Advantageous Effects of Invention

According to the aspects of the present invention, it is possible to appropriately cool the turbine stator vane, and it is possible to improve the durability of the turbine stator vane.

DESCRIPTION OF EMBODIMENTS

[Embodiment of Gas Turbine]

Hereinafter, an embodiment of a gas turbine according to the present invention will be described with reference to FIG. 1.

Figure 1:
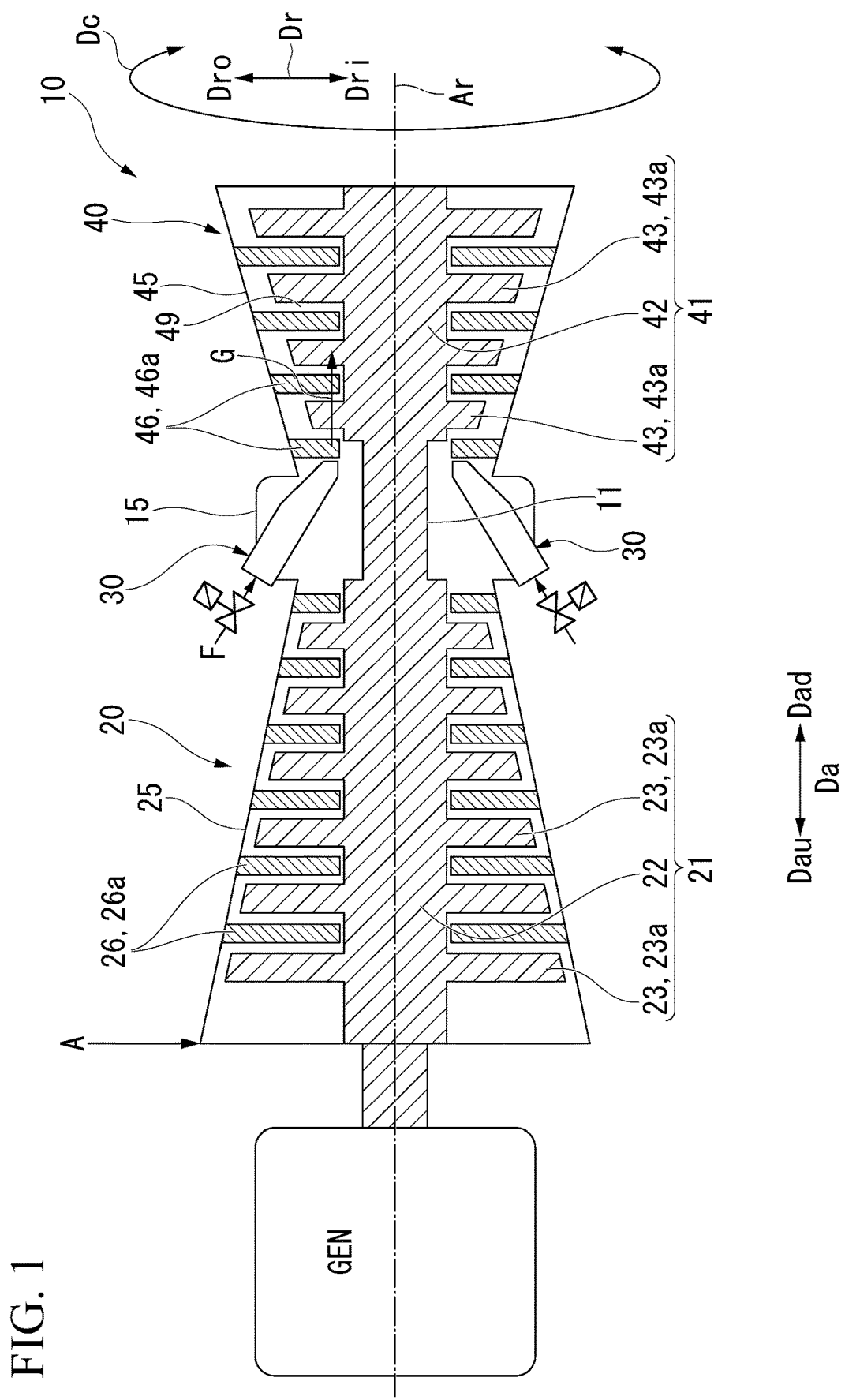
FIG. 1 is a schematic cross-sectional view of a gas turbine according to an embodiment of the present invention.

As shown in FIG. 1, a gas turbine 10 of the present embodiment includes a compressor 20 that compresses air A, a combustor 30 that burns fuel F in the air compressed by the compressor 20 to generate a combustion gas G, and a turbine 40 that is driven with the combustion gas G.

The compressor 20 has a compressor rotor 21 that rotates about an axis Ar, a compressor casing 25 that covers the compressor rotor 21, and a plurality of compressor stator vane trains 26. The turbine 40 has a turbine rotor 41 that rotates about the axis Ar, a turbine casing 45 that covers the turbine rotor 41, and a plurality of turbine stator vane trains 46.

The compressor rotor 21 and the turbine rotor 41 are located on the same axis and are connected to each other to form a gas turbine rotor 11. For example, a rotor of a generator GEN is connected to the gas turbine rotor 11. Further, the compressor casing 25 and the turbine casing 45 are connected to each other to form a gas turbine casing 15. Hereinafter, a direction in which the axis Ar extends is referred to as an axial direction Da, a circumferential direction about the axis Ar is simply referred to as a circumferential direction Dc, and a direction perpendicular to the axis Ar is referred to as a radial direction Dr. Further, in the axial direction Da, with the turbine 40 as a reference, the compressor 20 side is referred to as an axially upstream side Dau, and a side opposite thereto is referred to as an axially downstream side Dad. Further, in the radial direction Dr, a side closer to the axis Ar is referred to as a radially inner side Dri, and a side opposite thereto is referred to as a radially outer side Dro.

The compressor rotor 21 has a compressor rotor shaft 22 that extends in the axial direction Da centered on the axis Ar and a plurality of compressor rotor blade trains 23 attached to the compressor rotor shaft 22. The plurality of compressor rotor blade trains 23 are arranged in the axial direction Da. Each of the compressor rotor blade trains 23 is constituted by a plurality of compressor rotor blades 23a arranged in the circumferential direction Dc. The compressor stator vane train 26 is disposed on the axially downstream side Dad of each of the plurality of compressor rotor blade trains 23. Each of the compressor stator vane trains 26 is provided inside the compressor casing 25. Each of the compressor stator vane trains 26 is constituted by a plurality of compressor stator vanes 26a arranged in the circumferential direction Dc.

The turbine rotor 41 has a turbine rotor shaft 42 that extends in the axial direction Da centered on the axis Ar and a plurality of turbine rotor blade trains 43 attached to the turbine rotor shaft 42. The plurality of turbine rotor blade trains 43 are arranged in the axial direction Da. Each of the turbine rotor blade trains 43 is constituted by a plurality of turbine rotor blades 43a arranged in the circumferential direction Dc. The turbine stator vane train 46 is disposed on the axially upstream side Dau of each of the plurality of turbine rotor blade trains 43. Each of the turbine stator vane trains 46 is provided inside the turbine casing 45. Each of the turbine stator vane trains 46 is constituted by a plurality of turbine stator vanes 46a arranged in the circumferential direction Dc. Hereinafter, the turbine stator vane is simply referred to as a stator vane.

A space between an outer peripheral side of the turbine rotor shaft 42 and an inner peripheral side of the turbine casing 45 where the stator vanes 46a and the rotor blades 43a are disposed in the axial direction Da forms a combustion gas flow path 49 through which the combustion gas G from the combustor 30 flows. This combustion gas flow path 49 forms an annular shape centered on the axis Ar and is long in the axial direction Da.

The compressor 20 compresses the air A to generate compressed air. This compressed air flows into the combustor 30. The fuel F is supplied to the combustor 30. In the combustor 30, the fuel F is burned in the compressed air to generate the combustion gas G having a high-temperature and a high-pressure. This combustion gas G is sent from the combustor 30 to the combustion gas flow path 49 in the turbine 40. The combustion gas G rotates the turbine rotor 41 in the process of flowing through the combustion gas flow path 49 toward the axially downstream side Dad. By this rotation of the turbine rotor 41, the rotor of the generator GEN connected to the gas turbine rotor 11 is rotated.

Hereinafter, various embodiments relating to the stator vane 46a of the gas turbine 10 will be described.

[Embodiment of Stator Vane]

Hereinafter, a first embodiment of a stator vane according to the present invention will be described with reference to FIGS. 2 to 10.

Figure 2:
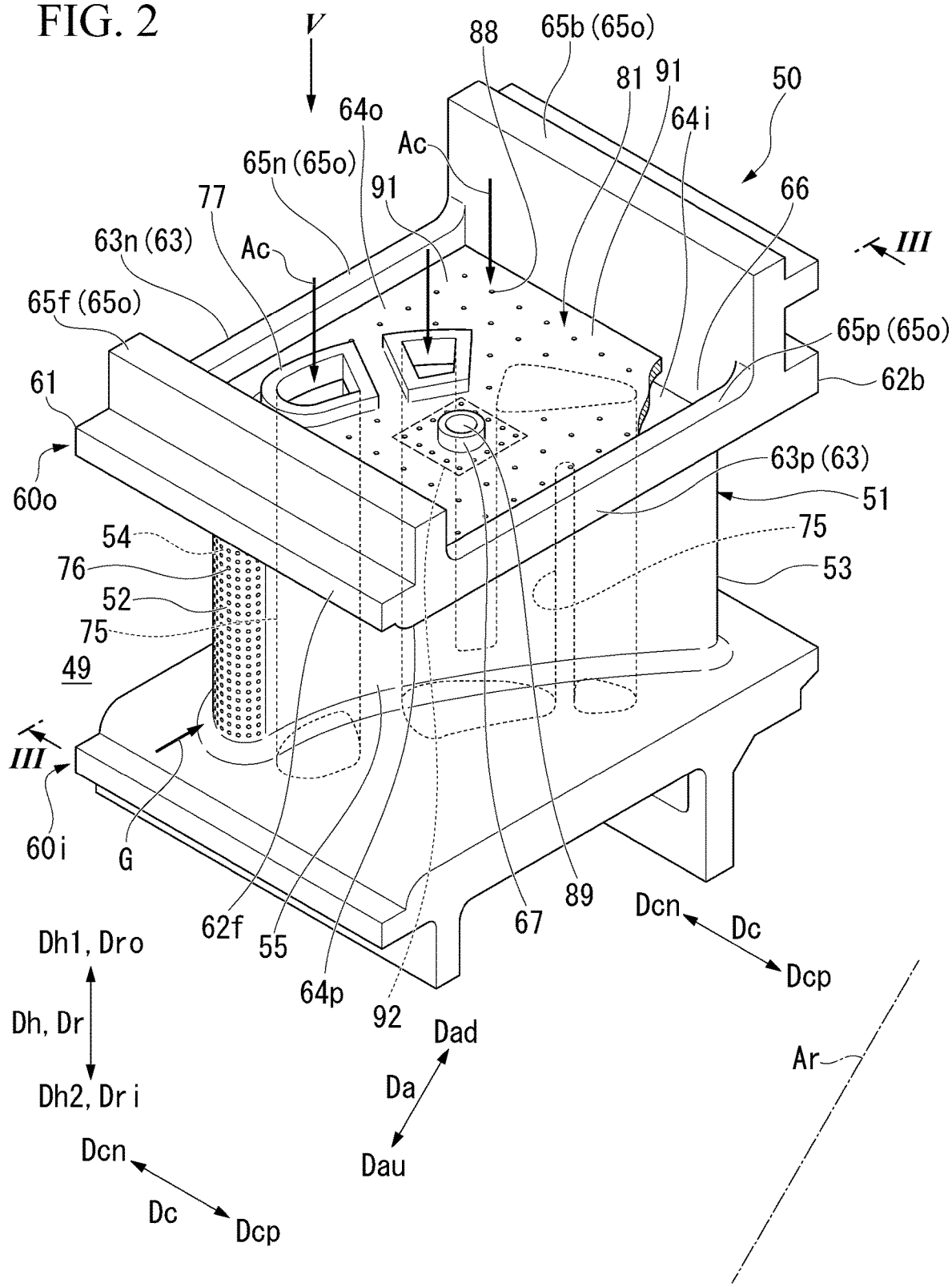
FIG. 2 is a perspective view of a gas turbine stator vane according to a first embodiment of the present invention.

As shown in FIG. 2, a stator vane 50 of the present embodiment has a blade body 51 forming a blade profile and extending in a blade height direction Dh, an inner shroud 60i formed at an end on a second side Dh2 out of a first side Dh1 and the second side Dh2 of the blade body 51 in the blade height direction Dh, and an outer shroud 60o formed at an end of the blade body 51 on the first side Dh1. When the stator vane 50 is attached to the turbine casing 45, the radial direction Dr and the blade height direction Dh coincide with each other, and thus, hereinafter, the blade height direction Dh is referred to as the radial direction Dr. When the stator vane 50 is attached to the turbine casing 45, the blade body 51 is disposed in the combustion gas flow path 49 through which the combustion gas G passes. The inner shroud 60i defines a position of the annular combustion gas flow path 49 on the radially inner side Dri. Further, the outer shroud 60o defines a position of the annular combustion gas flow path 49 on the radially outer side Dro.

When the stator vane 50 is attached to the turbine casing 45, a portion that is an end of the blade body 51 on the axially upstream side Dau forms a leading edge portion 52, and a portion that is an end of the blade body 51 on the axially downstream side Dad forms a trailing edge portion 53. In a surface of the blade body 51, out of sides toward the circumferential direction Dc, a convex side forms a suction side 54 of the blade (=a suction side), and a concave side forms a pressure side 55 of the blade (=a pressure side). For the convenience of the following description, the circumferential direction Dc may be referred to as a lateral direction Dc. Further, a side where the pressure side 55 of the blade exists with respect to the suction side 54 of the blade in the circumferential direction Dc is referred to as a circumferential pressure side Dcp of the blade, and a side where the suction side 54 of the blade exists with respect to the pressure side 55 of the blade in the circumferential direction Dc is referred to as a circumferential suction side Dcn of the blade. Further, the axially upstream side Dau in the axial direction Da may be referred to as a leading side, and the axially downstream side Dad in the axial direction Da may be referred to as a trailing side.

Hereinafter, a structure of the outer shroud 60o will be described. As shown in FIGS. 2 to 5, the outer shroud 60o has a plate-shaped outer shroud main body 61 that extends in the axial direction Da and the circumferential direction Dc and a peripheral wall 65o that protrudes from the outer shroud main body 61 toward the radially outer side Dro along an outer peripheral edge of the outer shroud main body 61.

Figure 5:
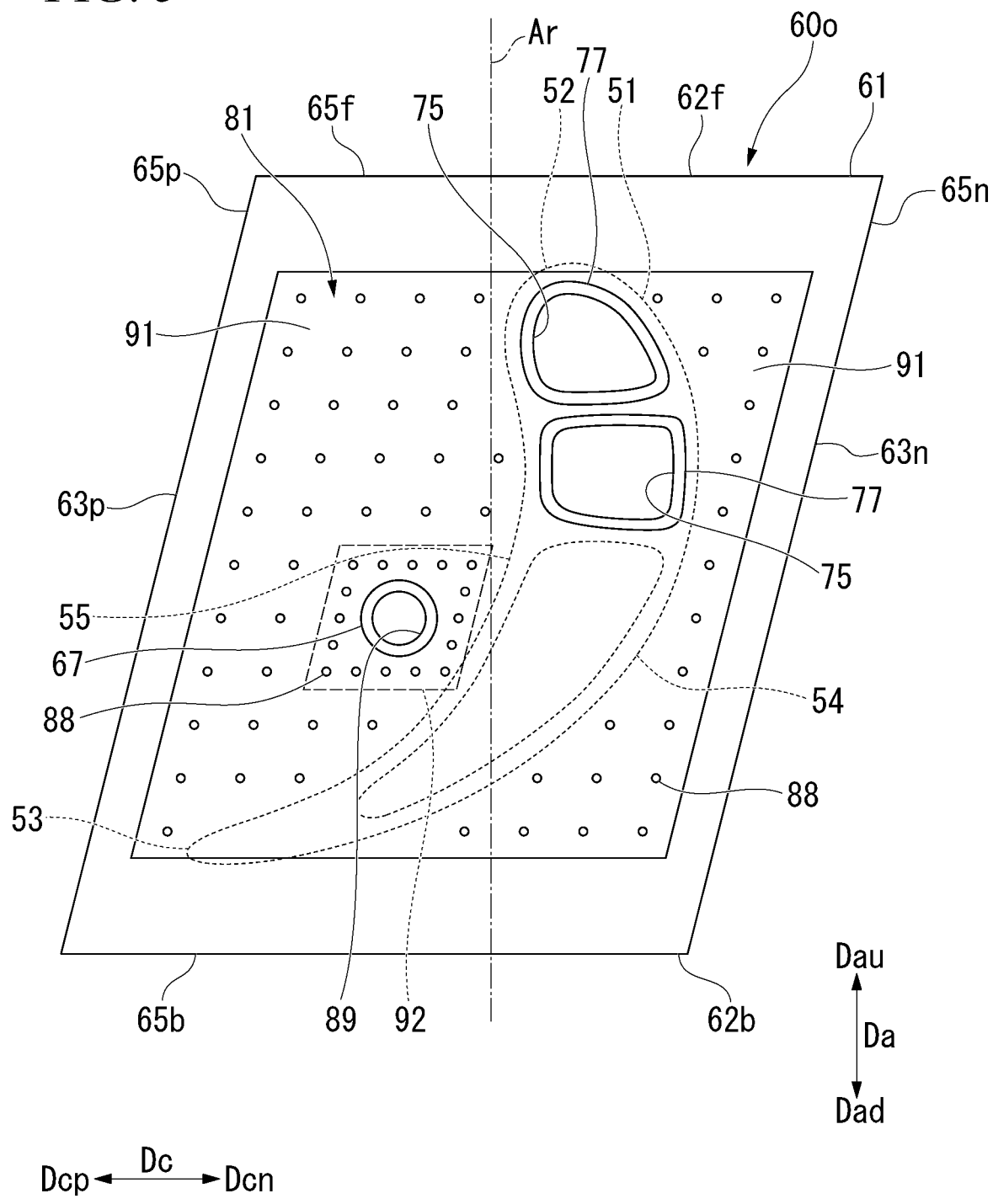
FIG. 5 is a view seen in a direction of arrow V in FIG. 2.

In the outer shroud main body 61A, a leading end surface 62f which is an end surface on the axially upstream side Dau in the axial direction, a trailing end surface 62b which is an end surface on the axially downstream side Dad, a pressure side end surface 63p of the blade which is an end surface of the circumferential pressure side Dcp of the blade, a suction side end surface 63n of the blade which is an end surface on the circumferential suction side Dcn of the blade, and a gas path surface 64p toward the radially inner side Dri are formed. The leading end surface 62f and the trailing end surface 62b are substantially parallel to each other. Further, the pressure side end surface 63p of the blade and the suction side end surface 63n of the blade are substantially parallel to each other. Therefore, the outer shroud main body 61 has a parallelogram shape as shown in FIG. 5 when seen in the radial direction Dr.

The peripheral wall 65o has a leading peripheral wall 65f and a trailing peripheral wall 65b facing each other in the axial direction Da and a pair of lateral peripheral walls 65p and 65n facing each other in the circumferential direction Dc. Both the leading peripheral wall 65f and the trailing peripheral wall 65b protrude from the outer shroud main body 61 toward the radially outer side Dro more than the pair of lateral peripheral walls 65p and 65n to form a hook portion. The leading peripheral wall 65f and the trailing peripheral wall 65b which form the hook portion serve to attach the stator vane 50 to an inner peripheral side of the turbine casing 45 (see FIG. 1). In the outer shroud 60o, a recess 66 recessed toward the radially inner side Dri is formed by the outer shroud main body 61 and the peripheral wall 65o.

The stator vane 50 further includes an impingement plate 81 that partitions a space inside the recess 66 of the outer shroud 60o into an outer space 64o on the radially outer side Dro and a cavity 64i on the radially inner side Dri. As shown in FIG. 5, in the impingement plate 81, a plurality of through holes 88 that penetrate the impingement plate 81 in the radial direction Dr are formed. Part of cooling air Ac existing on the radially outer side Dro of the impingement plate 81 flows into the cavity 64i through the plurality of through holes 88 provided in the impingement plate 81.

Figure 3:
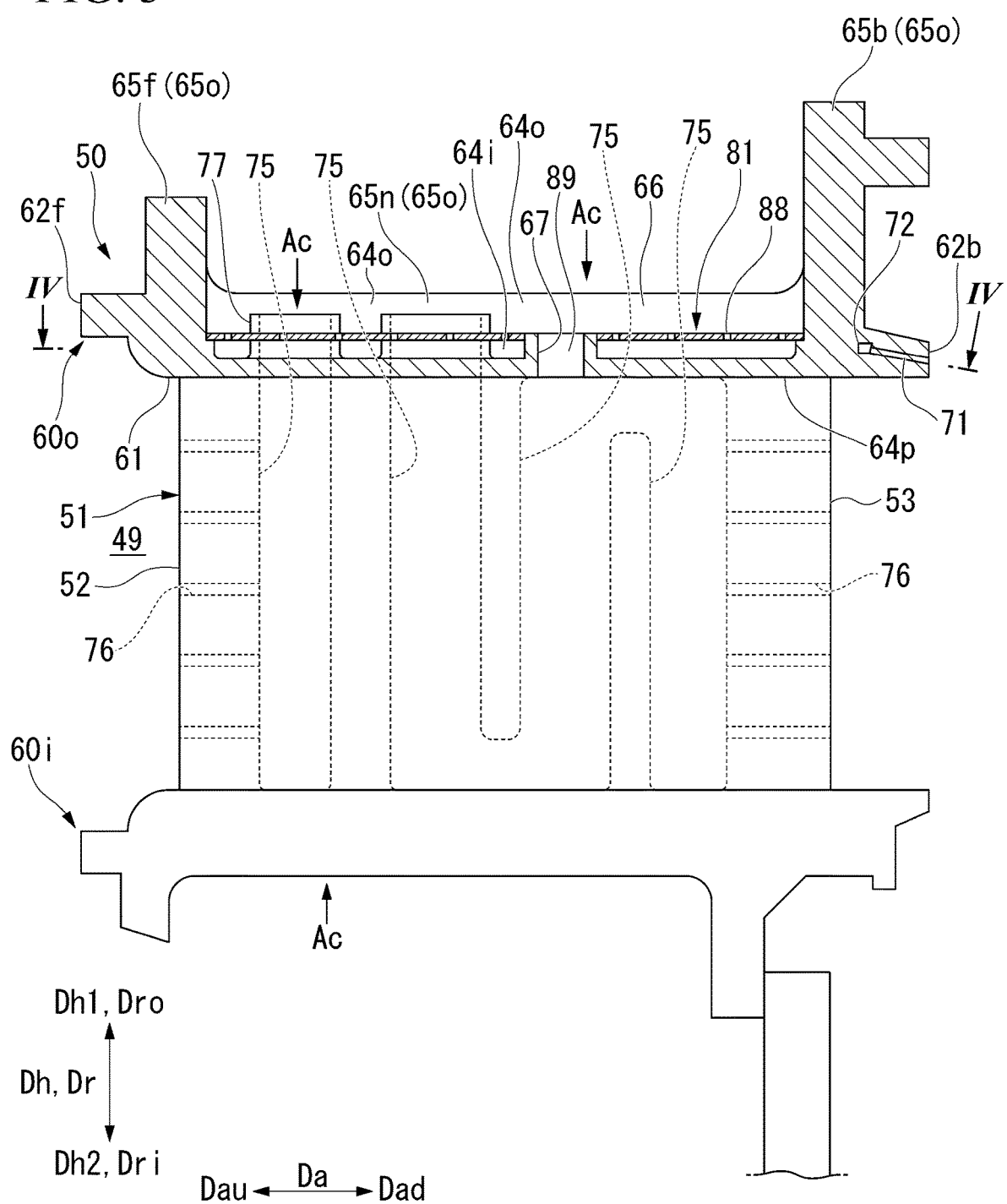
FIG. 3 is a cross-sectional view along line in FIG. 2.

As shown in FIGS. 2 and 3, in the outer shroud 60o and the impingement plate 81, a communication hole 89 which penetrates the outer shroud 60o and the impingement plate 81 in the blade height direction Dh (Dr) and through which the outer space 64o on the radially outer side Dro of the impingement plate 81 and the above-mentioned combustion gas flow path (an inner space) 49 with the outer shroud 60o as a reference communicate with each other is formed. The outer shroud 60o has a tubular portion 67 that extends from a bottom surface of the recess 66 toward the radially outer side Dro. An end of the tubular portion 67 on the radially outer side Dro is connected to the impingement plate 81, and an internal space of the tubular portion 67 forms part of an internal space of the communication hole 89.

Here, in a surface of the impingement plate 81, a region on the periphery of the communication hole 89 is referred to as a second region 92, and the other region is referred to as a first region 91. The sizes of the inner diameters of the plurality of through holes 88 in the first region 91 and the second region 92 are substantially uniform. Further, the plurality of through holes 88 in the first region 91 and the second region 92 are regularly disposed. However, the distance between the opening centers of the plurality of through holes 88 in the second region 92 is narrower than the distance between the opening centers of the plurality of through holes 88 in the first region 91. As a result, the opening number density in the second region 92 is higher than the opening number density in the first region 91. An opening number density is the number of the through holes 88 per unit area in the surface of the impingement plate 81. Therefore, the opening ratio in the second region 92 is higher than the opening ratio in the first region 91. An opening ratio is a ratio of the opening area by the plurality of through holes 88 to the total area of each region.

As shown in FIG. 3, in the blade body 51, the outer shroud 60*o*, and the inner shroud 60*i*, a plurality of blade air passages 75 extending in the radial direction Dr are formed. Each of the blade air passages 75 is formed continuously from the outer shroud 60*o* to the inner shroud 60*i* via the blade body 51. The plurality of blade air passages 75 are arranged along a camber line of the blade body 51. Part of the adjacent blade air passages 75 communicates with each other at a portion on the radially outer side Dro or a portion on the radially inner side Dri. The outer shroud 60*o* has a blade air tubular portion 77 extending from the bottom surface of the recess 66 toward the radially outer side Dro. An internal space of the blade air tubular portion 77 forms part of an internal space of the blade air passage 75. The blade air tubular portion 77 penetrates the impingement plate 81 and opens at an end on the radially outer side Dro. In the leading edge portion 52 and the trailing edge portion 53 of the blade body 51, a plurality of blade surface ejection passages 76 penetrating the blade body 51 from the blade air passage 75 to the combustion gas flow path 49 are formed.

Figure 4:
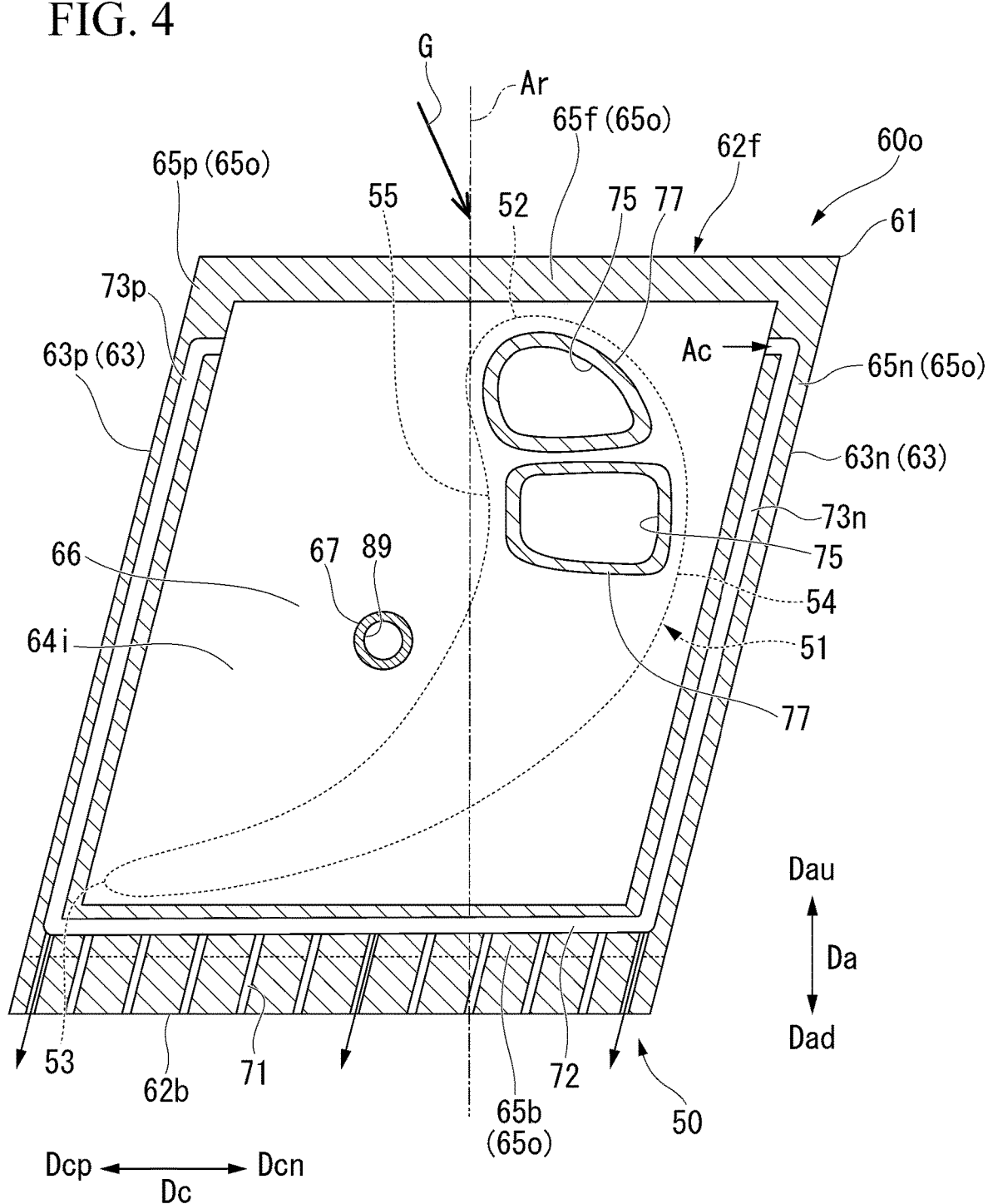
FIG. 4 is a cross-sectional view along line IV-IV in FIG. 3.

As shown in FIG. 4, out of the pair of lateral peripheral walls 65*p* and 65*n* of the outer shroud 60*o*, in the lateral peripheral wall 65*p* on the circumferential pressure side Dcp of the blade (a pressure side peripheral wall of the blade), a pressure side passage 73*p* of the blade that extends in a direction having a component in the axial direction Da is formed along the pressure side end surface 63*p* of the blade. Further, in the lateral peripheral wall 65*n* on the circumferential suction side Dcn of the blade (a suction side peripheral wall of the blade), a suction side passage 73*n* of the blade that extends in a direction having a component in the axial direction Da is formed along the suction side end surface 63*n* of the blade. Both the pressure side passage 73*p* of the blade and the suction side passage 73*n* of the blade communicate with the cavity 64*i* at upstream ends thereof. Further, the pressure side passage 73*p* of the blade and the suction side passage 73*n* of the blade are connected to each other via a connecting passage 72 formed in parallel to a direction of the trailing end surface 62*b*. Further, in the outer shroud main body 61, a plurality of trailing end passages 71 which are on the axially downstream side Dad with the cavity 64*i* as a reference and the plurality of trailing end passages 71 of which upstream ends are connected to the connecting passage 72 are formed. The plurality of trailing end passages 71 open at the trailing end surface 62*b* of the outer shroud main body 61. The plurality of trailing end passages 71 are arranged parallel to the circumferential direction (the lateral direction) Dc.

The combustion gas G flows between the outer shroud 60*o* and the inner shroud 60*i* of the stator vane 50. Therefore, the blade body 51 disposed between the outer shroud 60*o* and the inner shroud 60*i* is heated with the combustion gas G. Therefore, the cooling air Ac flows through the blade air passage 75 to cool the blade body 51. Further, the cooling air Ac that has flowed into the blade air passage 75 flows out from the blade surface ejection passage 76 into the combustion gas flow path 49. Therefore, the leading edge portion 52 and the trailing edge portion 53 of the blade body 51 are cooled with the cooling air Ac in the process of the cooling air Ac flowing out from the blade surface ejection passage 76. Further, part of the cooling air Ac that has flowed out from the blade surface ejection passage 76 into the combustion gas flow path 49 partially covers the surface of the blade body 51 and also serves as film air.

Figure 6:
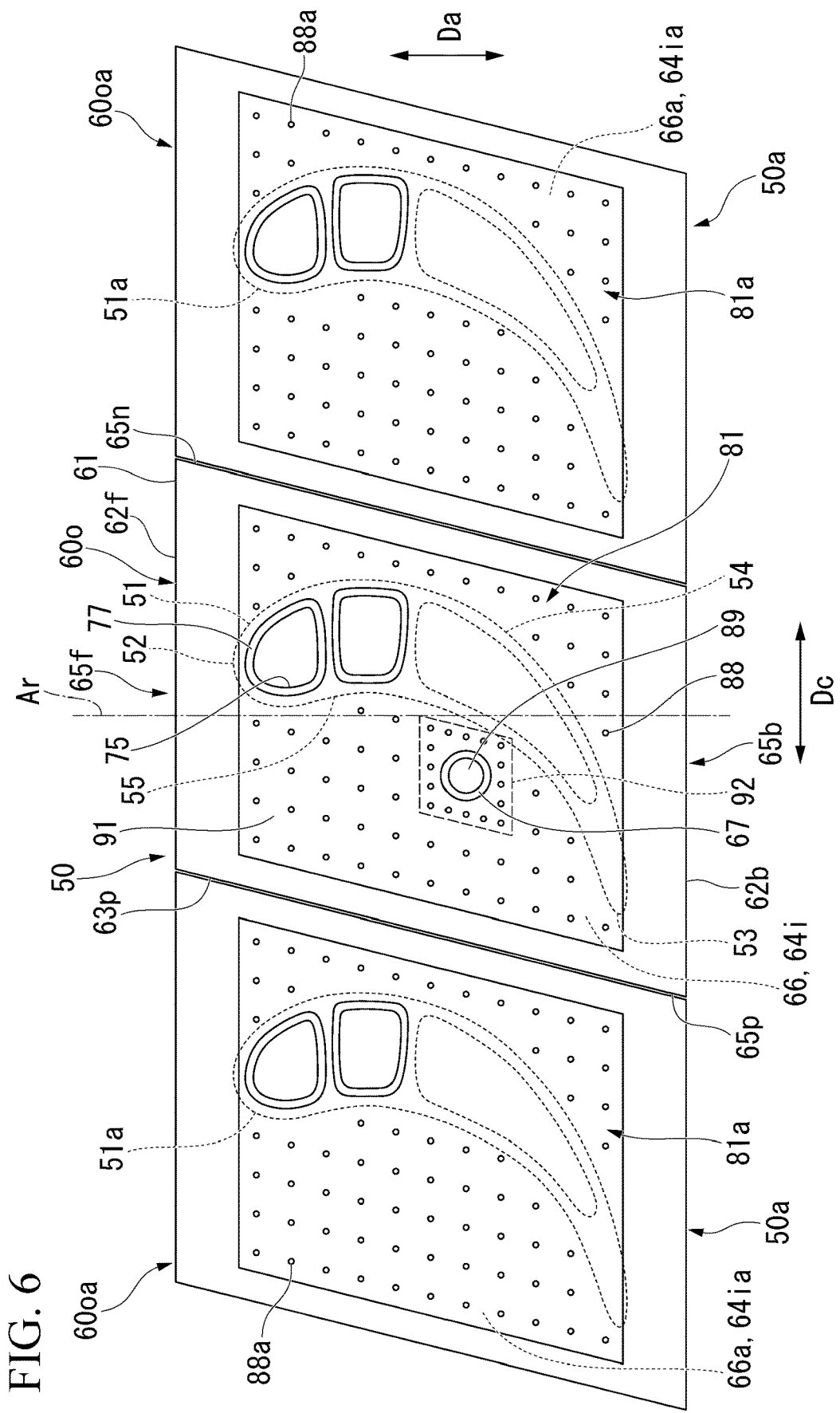
FIG. 6 is a view of part of a stator vane train according to the first embodiment of the present invention when seen from a radially outer side.

As shown in FIG. 6, in a case in which part of the turbine stator vane train 46 is seen from the radially outer side Dro, one stator vane constituting the turbine stator vane train 46 constitutes a first stator vane 50 described above, and a stator vane adjacent to the first stator vane train in the circumferential direction Dc constitutes a second stator vane 50*a*. The second stator vane 50*a* has a second blade body 51*a*, a second inner shroud (not shown), and a second outer shroud 60*oa*. The second blade body 51*a* is basically the same as the blade body 51 in the first stator vane 50. The second inner shroud is basically the same as the inner shroud 60*i* in the first stator vane 50. The second outer shroud 60*oa* is basically the same as the outer shroud 60*o* in the first stator vane 50. The second outer shroud 60*oa* has a second recess 66*a* which is recessed toward the radially inner side Dri and the second recess 66*a* of which the radially outer side Dro opens. The second recess 66*a* corresponds to the recess 66 in the first stator vane 50. A second impingement plate 81*a* corresponding to the impingement plate 81 of the first stator vane 50 is provided in an opening of the second recess 66*a* to form a second cavity 64*ia* inside the second recess 66*a*. In the second impingement plate 81*a*, a plurality of second through holes 88*a* which penetrate the second impingement plate 81*a* in the radial direction Dr and through which a second outer space 64*oa* that is a space on the radially outer side Dro and the second cavity 64*ia* with the second impingement plate 81*a* as a reference communicate with each other are formed. In the second impingement plate 81*a* and the second outer shroud 60*oa*, the communication hole 89 in the first stator vane 50 is not formed. Further, the second through holes 88*a* are regularly disposed, and a region corresponding to the second region 92 in the first stator vane 50 does not exist.

Figure 9:
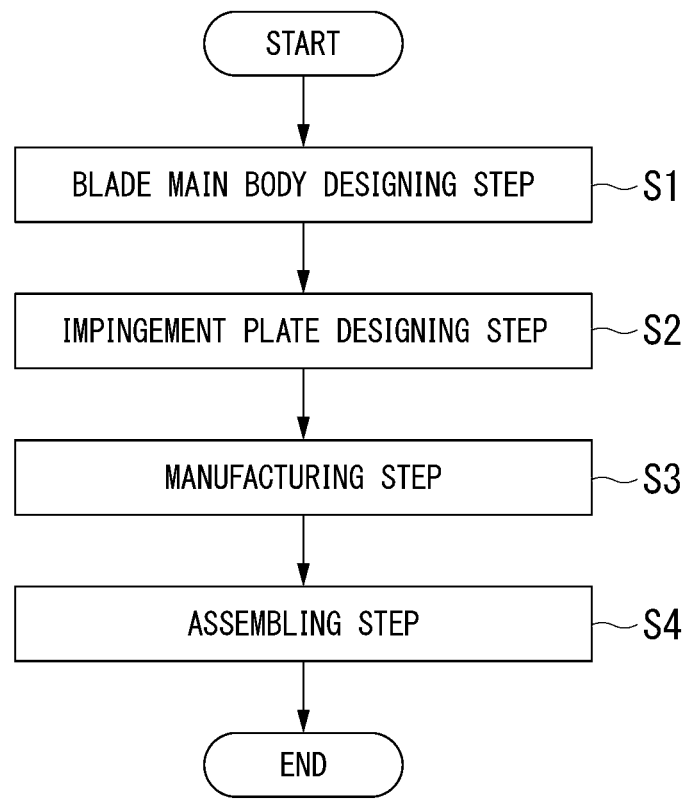
FIG. 9 is a flowchart showing a method of manufacturing a gas turbine stator vane according to the first embodiment of the present invention.
Figure 10:
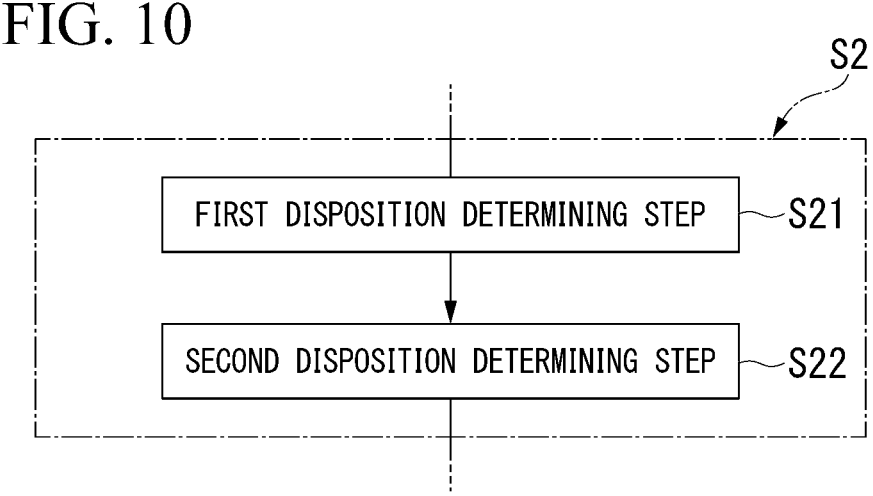
FIG. 10 is a flowchart showing details of an impingement plate designing step according to the first embodiment of the present invention.

Next, a method of manufacturing the stator vane 50 will be described with reference to FIGS. 9 and 10. As shown in FIG. 9, in the manufacture of the stator vane 50, a blade main body designing step (S1), an impingement plate designing step (S2), a manufacturing step (S3), and an assembling step (S4) are executed.

In the blade main body designing step (S1), a blade main body constituted by the blade body 51, the outer shroud 60*o*, and the inner shroud 60*i* is designed. The outer shroud 60*o* designed in the blade main body designing step (S1) has the recess 66 which is recessed toward the second side Dh2 and the recess 66 of which the first side Dh1 opens.

In the impingement plate designing step (S2), the impingement plate 81 that forms the cavity 64*i* with the outer shroud 60*o* is designed. The impingement plate designed in the impingement plate designing step (S2) is provided in an opening of the recess 66 to form the cavity 64*i* inside the recess 66. Here, as shown in FIG. 10, the impingement plate designing step (S2) includes a first disposition determining step (S21) and a second disposition determining step (S22). In the first disposition determining step (S21), the disposition of the plurality of through holes 88 which penetrate the impingement plates 81 in the blade height direction Dh and through which the outer space 64*o* that is a space on the first side Dh1 and the cavity 64*i* with the impingement plate 81 as a reference communicate with each other is determined. At this time, the disposition of the plurality of through holes 88 included in the first region 91 in the surface of the impingement plate 81 is determined.

Further, the disposition of the plurality of through holes 88 in the second region 92 is determined such that the opening ratio of the second region 92 in the surface of the impingement plate 81 is higher than the opening ratio of the first region 91 in the surface of the impingement plate 81. Specifically, the disposition of the plurality of through holes 88 is determined such that the opening number density in the second region 92 is higher than the opening number density in the first region 91. In the second disposition determining step (S22), the disposition of the communication hole 89 which penetrates the impingement plate 81 and the outer shroud 60o in the blade height direction Dh and through which the combustion gas flow path (the inner space) 49 that is a space on the second side Dh2 and the outer space 64o with the outer shroud 60o as a reference communicate with each other is determined.

In the manufacturing step (S3), the blade main body designed in the blade main body designing step S1 and the impingement plate 81 designed in the impingement plate designing step S2 are manufactured. In this manufacturing step (S3), for example, the blade main body is manufactured by casting. Further, in this manufacturing step (S3), holes are made in a metal plate with a tool such as a drill to manufacture the impingement plate 81. In the assembling step (S4), the impingement plate 81 is assembled to the blade main body manufactured in the manufacturing step S3. Specifically, the impingement plate 81 is welded to the opening of the recess 66 of the outer shroud 60o. Further, the impingement plate 81 is also welded to the tubular portion 67 and the blade air tubular portion 77 of the outer shroud 60o.

Since the gas path surface 64p of the outer shroud 60o and a gas path surface of the inner shroud 60i are heated with the combustion gas G, they need to be cooled. Here, the description of a method of cooling the inner shroud 60i will be omitted, and a method of cooling the outer shroud 60o will be described.

The cooling air Ac existing on the radially outer side Dro of the outer shroud 60o flows into the cavity 64i through the plurality of through holes 88 of the impingement plate 81. The cooling air Ac ejected from the plurality of through holes 88 of the impingement plate 81 impinges against the bottom surface of the recess 66 of the outer shroud 60o, and the bottom surface is cooled in an impingement manner. As a result, in the gas path surface 64p of the outer shroud 60o, a region corresponding to the bottom surface of the recess 66 is cooled.

Part of the cooling air Ac that has flowed into the cavity 64i of the outer shroud 60o flows into the pressure side passage 73p of the blade, flows from the connecting passage 72 to the trailing end passage 71, and flows out from the opening of the trailing end surface 62b. In the gas path surface 64p of the outer shroud 60o, a region along the pressure side end surface 63p of the blade is cooled with the cooling air Ac in the process of the cooling air Ac flowing through the pressure side passage 73p of the blade. Another part of the cooling air Ac that has flowed into the cavity 64i of the outer shroud 60o flows into the suction side passage 73n of the blade, flows from the connecting passage 72 to the trailing end passage 71, and flows out from the opening of the trailing end surface 62b. In the gas path surface 64p of the outer shroud 60o, a region along the suction side end surface 63n of the blade is cooled in the process of the cooling air Ac flowing through the suction side passage 73n of the blade.

In the gas path surface 64p of the outer shroud 60o, a region along the trailing end surface 62b of the blade is cooled with the cooling air Ac in the process of the cooling air Ac flowing through the trailing end passage 71. In the gas path surface 64p of the outer shroud 60o, a region along the suction side end surface 63n of the blade and the trailing end surface 62b is cooled with the cooling air Ac flowing through the suction side passage 73n of the blade. Further, in the gas path surface 64p of the outer shroud 60o, a region along the pressure side end surface 63p of the blade and the trailing end surface 62b is cooled with the cooling air Ac flowing through the pressure side passage 73p of the blade.

Figure 7:
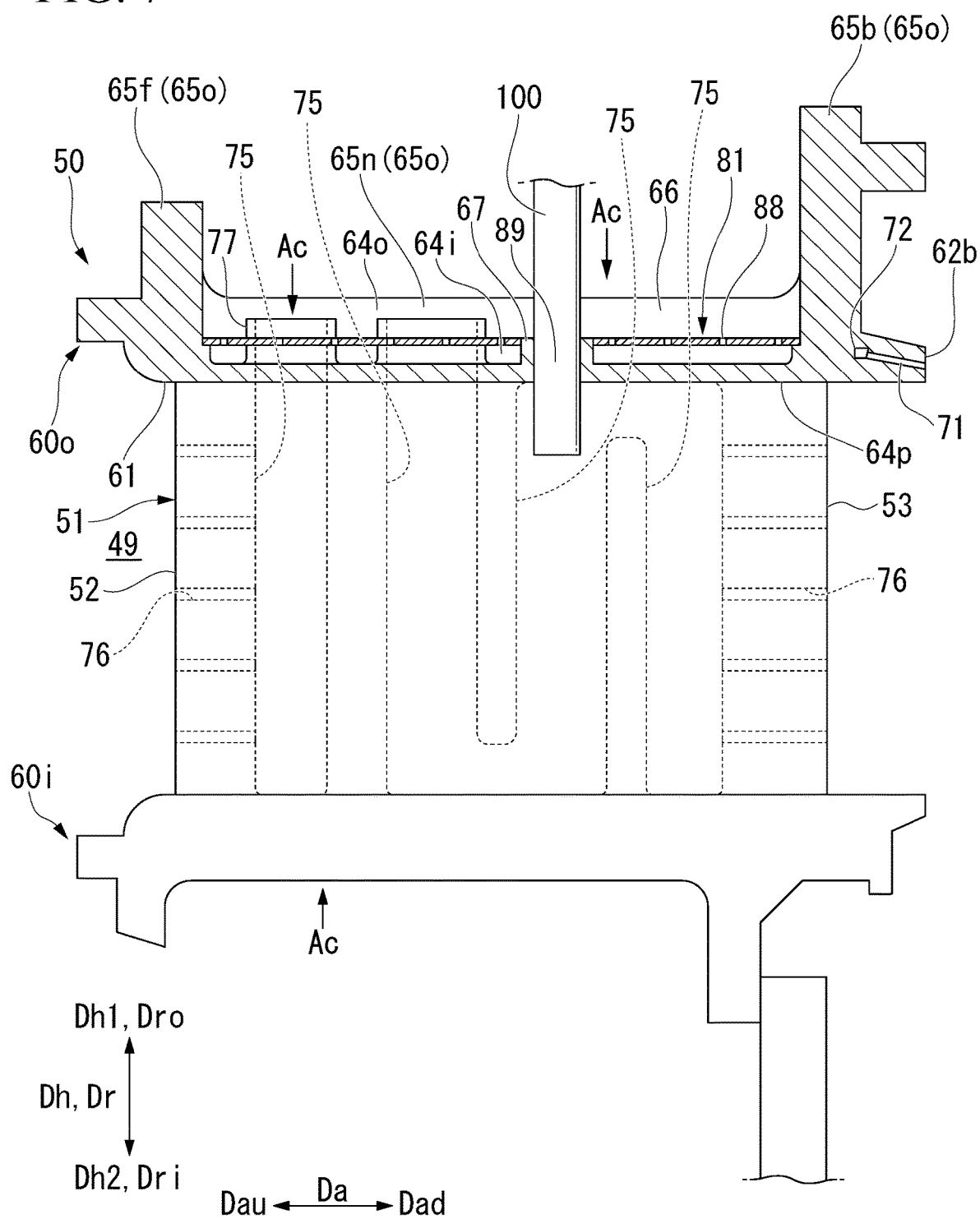
FIG. 7 is a cross-sectional view of a gas turbine stator vane with a probe inserted thereinto in the first embodiment of the present invention.
Figure 8:
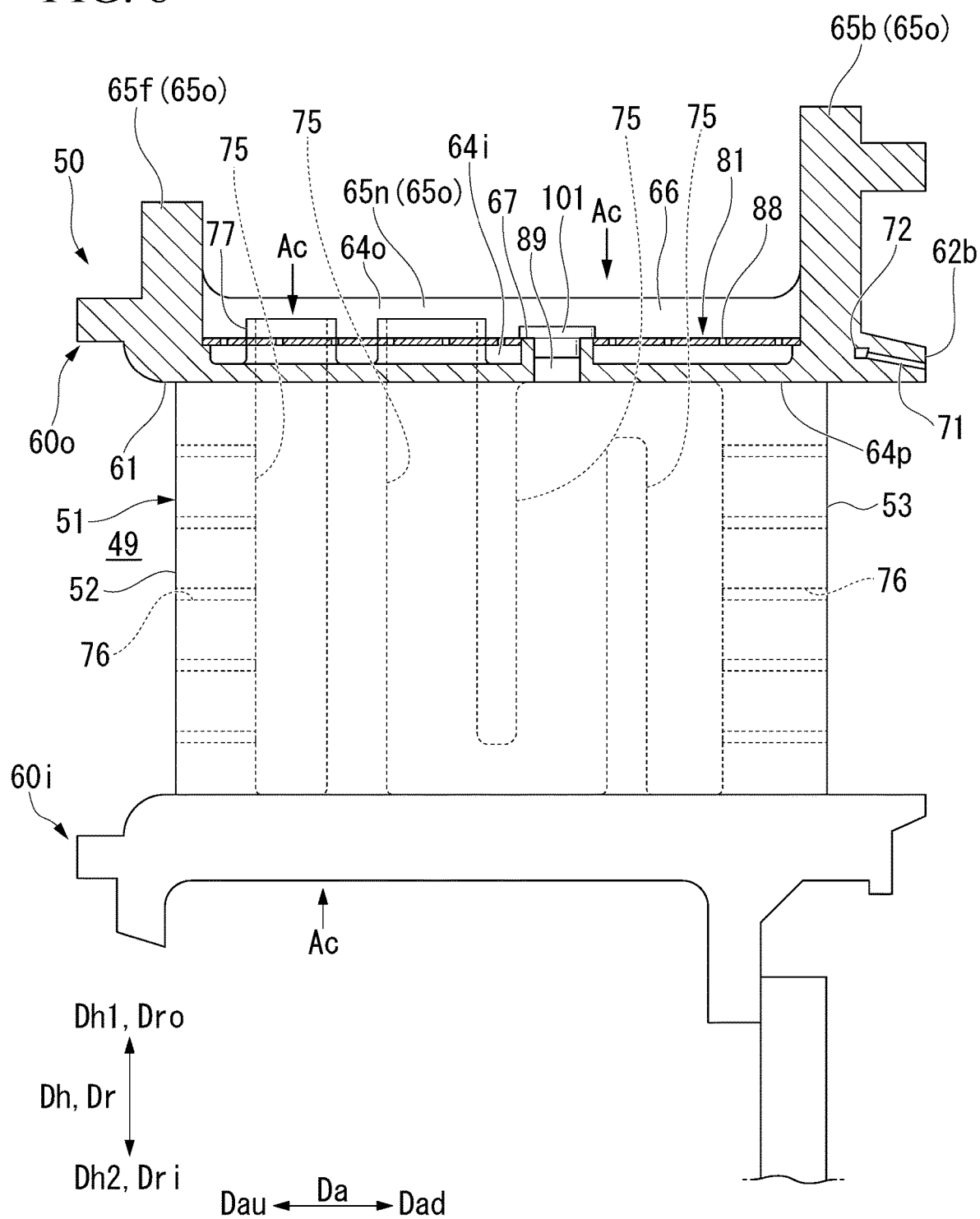
FIG. 8 is a vertical cross-sectional view of a gas turbine stator vane with a plug attached thereto in the first embodiment of the present invention.

By the way, as shown in FIGS. 2 and 7, in a case in which the impingement plate 81 is provided with the communication hole 89 through which a probe 100 for inspecting the stator vane 50 is inserted, the through hole 88 is not formed in a region of the impingement plate 81 where the communication hole 89 exists. Therefore, it is difficult to cool the periphery of the communication hole 89. The communication hole 89 is closed using a plug 101 shown in FIG. 8 during the operation of the gas turbine 10. On the other hand, at the time of periodic inspection, the plug 101 is removed, and, as shown in FIG. 7, the probe 100 is inserted from the radially outer side Dro of the stator vane 50 to inspect the state of damage to the stator vane 50.

The impingement plate 81 according to the outer shroud 60o of the present embodiment includes the plurality of through holes 88 together with the communication holes 89 as described above, and the second region 92 of which the opening number density is higher than that of the first region 91 exists on the surface of the impingement plate 81. Therefore, in the present embodiment, the amount of the cooling air Ac flowing into the cavity 64i is larger than that in a case in which the entire region of the impingement plate 81 is made as the first region 91, and the entire outer shroud 60o can be appropriately cooled. Further, by the second region being disposed on the periphery of the communication hole 89 which is difficult to be cooled, the amount of cooling air Ac flowing into the region on the periphery of the communication hole 89 in the bottom surface of the recess 66 increases, and the periphery of the communication hole 89 can be effectively cooled. As a result, a strain of the periphery of the communication hole 89 due to thermal stress can be suppressed.

As described above, in the present embodiment, by disposing the second region 92 on the periphery of the communication hole 89 which is difficult to be cooled, it is possible to enhance a cooling capacity. Therefore, according to the present embodiment, the durability of the stator vane 50 can be improved even in a case in which the communication hole 89 for inserting the inspection probe is provided.

The impingement plate 81 of the present embodiment is provided with the second region 92 to enhance the cooling capacity in the second region 92. Further, in the present embodiment, it is possible to make the inner diameters of the plurality of through holes 88 the same size. Therefore, the type of drill used for drilling is limited to one, and it is not necessary to replace the drill to form a plurality of through holes 88, and the drilling work can be easily performed.

[Second Embodiment of Stator Vane]

Figure 11:
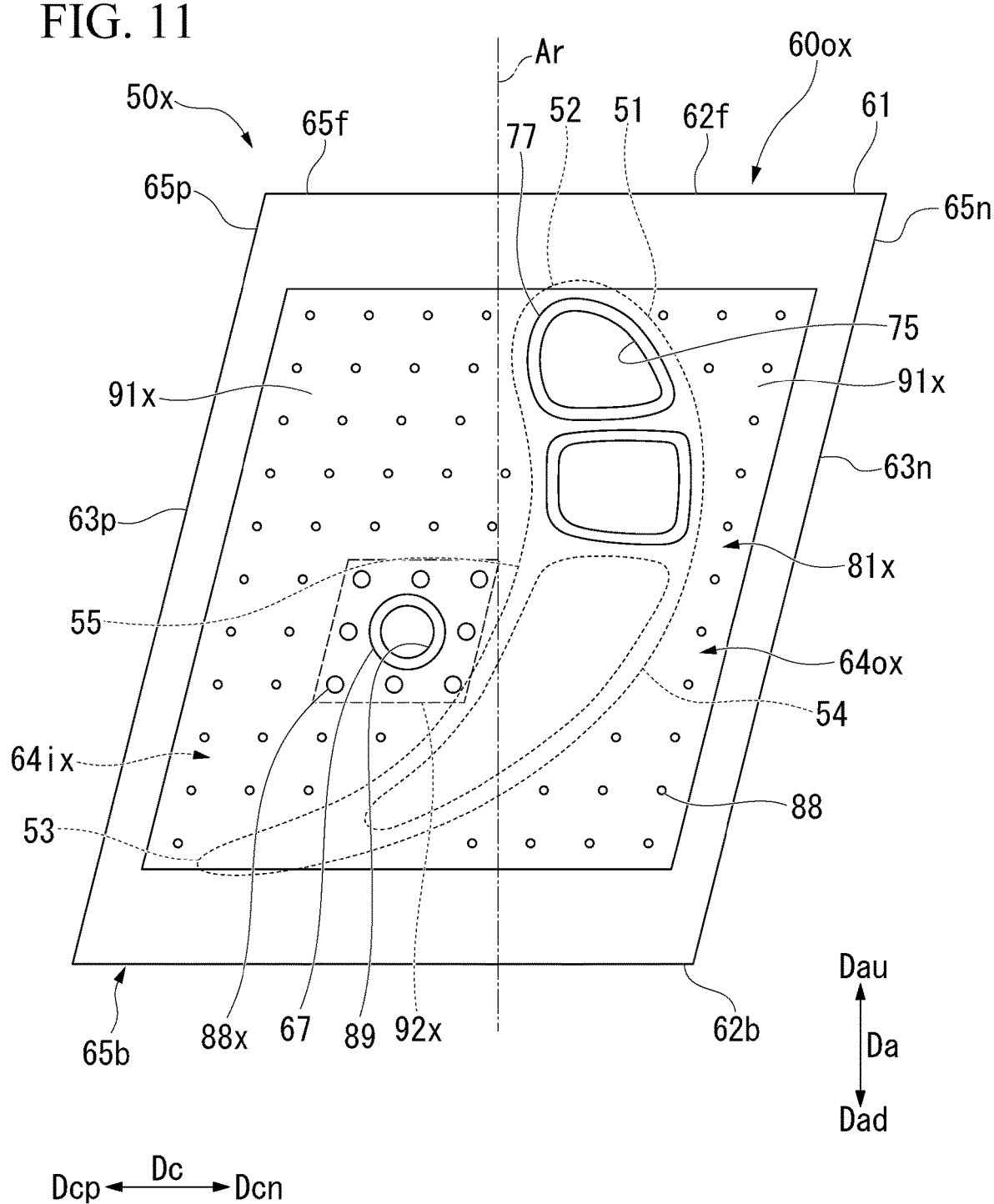
FIG. 11 is a view of a gas turbine stator vane according to a second embodiment of the present invention when seen from the radially outer side.

Hereinafter, a second embodiment of a stator vane according to the present invention will be described with reference to FIG. 11.

In a stator vane 50x of the second embodiment, the size of part of the plurality of through holes 88 in the impingement plate 81 of the first embodiment is changed, and other configurations are the same as those of the stator vane 50 of the first embodiment. Therefore, in the present embodiment, a detailed description of the same configuration elements as those in the first embodiment will be omitted.

In an impingement plate 81x of the present embodiment, the inner diameters of a plurality of through holes 88x included in a second region 92x (a region indicated by a dotted line in FIG. 11) formed on the impingement plate 81x are larger than the inner diameters of the plurality of through holes 88 included in a first region 91x.

Further, the distance between the opening centers of the two adjacent through holes 88 in the first region 91x is equal to the distance between the opening centers of the two adjacent through holes 88x in the second region 92x. Therefore, the opening number density in the first region 91x is the same as the opening number density in the second region 92x. Thus, the opening ratio of the second region 92x is higher than the opening ratio of the first region 91x. The through hole 88x having a large inner diameter in the second region 92x is formed not to overlap the communication hole 89.

Figure 12:
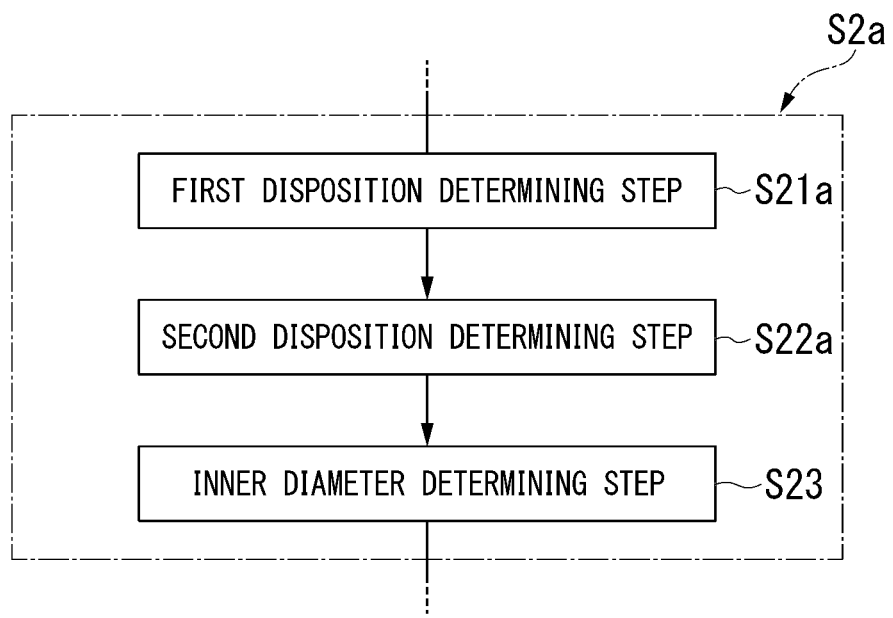
FIG. 12 is a flowchart showing details of an impingement plate designing step according to the second embodiment of the present invention.

As shown in FIG. 12, a method of manufacturing the stator vane 50x according to the second embodiment is different from the method of manufacturing the stator vane 50 according to the first embodiment in the impingement plate designing step. An impingement plate designing step (S2a) according to the second embodiment includes a first disposition determining step (S21a), a second disposition determining step (S22a), and an inner diameter determining step (S23). In the first disposition determining step (S21a), the disposition of the plurality of through holes 88 and 88x which penetrate the impingement plates 81x in the blade height direction Dh and through which an outer space 64ox that is a space on the first side Dh1 and a cavity 64ix with the impingement plate 81x as a reference communicate with each other is determined while the first region 91x and the second region 92x are not distinguished from each other. In the second disposition determining step (S22a), the disposition of the communication hole 89 which penetrates the impingement plate 81x and an outer shroud 60ox in the blade height direction Dh and through which the combustion gas flow path 49 (the inner space) that is a space on the second side Dh2 and the outer space 64ox with the outer shroud 60ox as a reference communicate with each other is determined. In the inner diameter determining step (S23), the inner diameters of the plurality of through holes 88 included in the first region 91x in the surface of the impingement plate 81x are determined, and the inner diameters of the plurality of through holes 88x included in the second region 92x in the surface of the impingement plate 81x are determined. At this time, the inner diameters of the plurality of through holes 88x included in a second region 92x are made larger than the inner diameters of the plurality of through holes 88 included in the first region 91x.

After the impingement plate designing step (S2a) is executed, the stator vane 50x of the present embodiment is completed by the execution of the manufacturing step (S3) and the assembling step (S4) as in the first embodiment.

According to the configuration of the present embodiment, the opening ratio of the second region 92x is higher than the opening ratio of the first region 91x, and thus the amount of cooling air Ac flowing into the cavity 64ix is larger than that in a case in which the entire region of the impingement plate 81x is made as the first region 91x, and the entire outer shroud 60ox can be appropriately cooled. Further, by the second region 92x being disposed on the periphery of the communication hole 89 which is difficult to be cooled, the amount of the cooling air Ac flowing into the region on the periphery of the communication hole 89 in a bottom surface of a recess 66x increases, and the periphery of the communication hole 89 can be effectively cooled. As a result, a strain of the periphery of the communication hole 89 due to thermal stress can be suppressed.

Further, since the distance between the opening centers of the plurality of adjacent through holes 88x in the second region 92x and the distance between the opening centers of the plurality of adjacent through holes 88 in the first region 91x are formed to be the same, it is possible to enhance the cooling capacity on the periphery of the communication hole 89 without increasing the number of the through holes 88 and 88x.

Further, in a case in which drilling is performed using a machine such as a machining center, the arrangement of the plurality of through holes 88 in the first region 91x and the arrangement of the plurality of through holes 88x in the second region 92x are the same, and thus a tool is easily positioned, and setting of machining conditions can be simplified.

[Third Embodiment of Stator Vane]

Hereinafter, a third embodiment of a stator vane according to the present invention will be described with reference to FIG. 13.

In a stator vane 50y of the present embodiment, the position of the second region 92 in the stator vane 50 of the first embodiment is changed.

Figure 13:
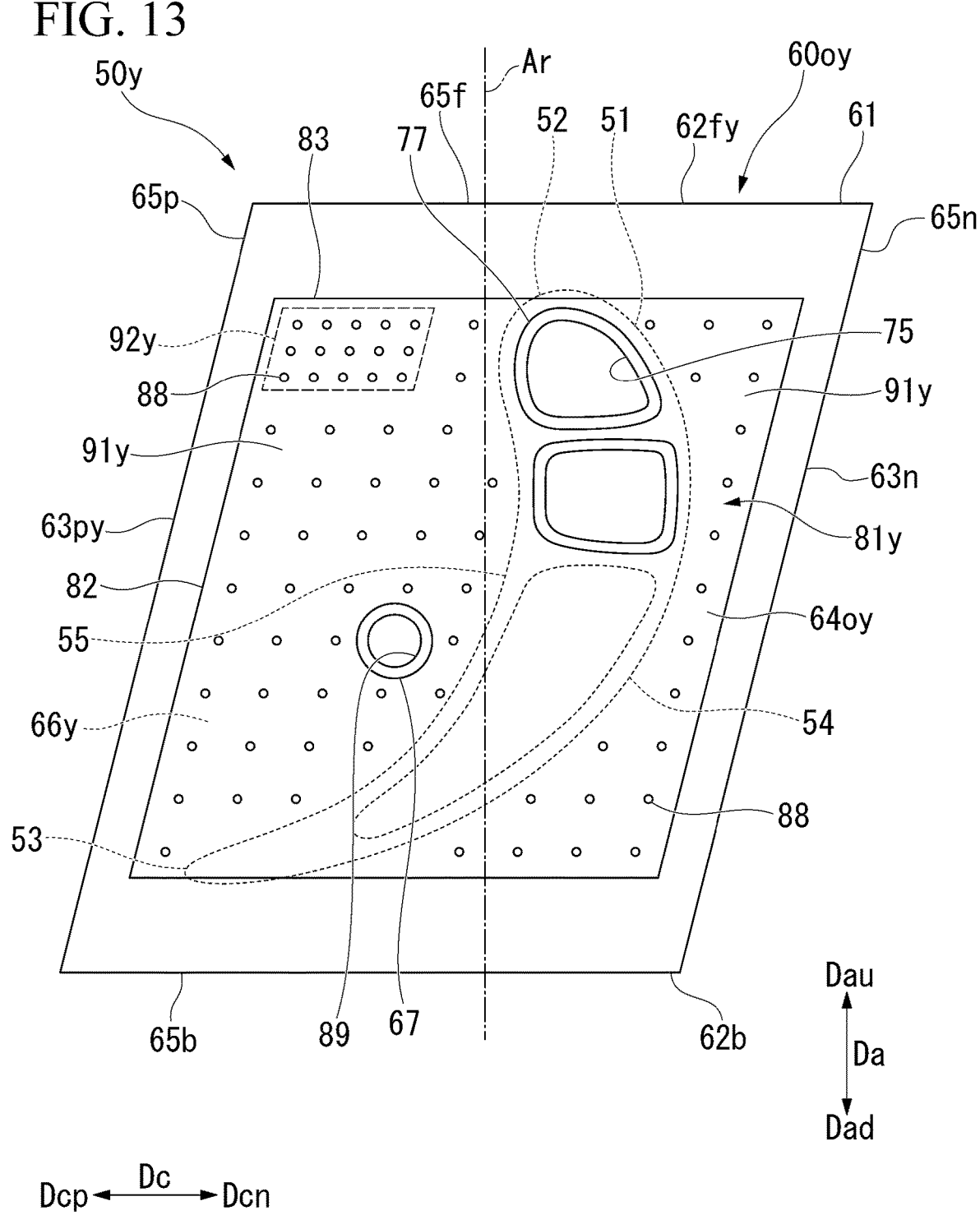
FIG. 13 is a view of a gas turbine stator vane according to a third embodiment of the present invention when seen from the radially outer side.

As shown in FIG. 13, in the stator vane 50y of the present embodiment, a second region 92y (a region surrounded by a dotted line in FIG. 13) is provided at a corner formed by a pressure-side side 82 of the blade and a leading-side side 83 of the blade of an impingement plate 81y. The opening number density in the second region 92y is higher than the opening number density in a first region 91y as in the first embodiment.

In the present embodiment as well, as in the first embodiment, since the second region 92y is provided, the amount of the cooling air Ac flowing into the cavity 64iy increases. Therefore, by providing the second region 92y on the impingement plate 81y, it is possible to appropriately cool the entire outer shroud 60oy. That is, the position of the second region is not limited to the periphery of the communication hole 89, and the second region may be disposed at any position in the impingement plate. However, as in the first and second embodiments, it is preferable to dispose the second region 92y on the periphery of the communication hole 89y.

As described in the second embodiment, the second region 92y may be formed such that the opening ratio is higher than that of the first region 91y with the inner diameter of the through hole 88 being increased. Further, the second region 92y may be disposed at a position away from the communication hole 89 and on the periphery of the communication hole 89. In this case, the entire outer shroud 60oy can be appropriately cooled, and the cooling capacity on the periphery of the communication hole 89 can be improved.

Although the embodiments of the present invention have been described in detail with reference to the drawings, the specific configuration of the implementation according to the present invention is not limited to these embodiments and also includes a change in design or the like in a range not departing from the gist of the present invention. For example, the through holes having two or more different sizes may be provided, and the shape of the opening of the through holes is not limited to a circle and may be, for example, a square.

INDUSTRIAL APPLICABILITY

According to the aspects of the present invention, it is possible to appropriately cool the turbine stator vane, and it is possible to improve the durability of the turbine stator vane.

REFERENCE SIGNS LIST

10 Gas turbine
11 Gas turbine rotor
15 Gas turbine casing
20 Compressor
21 Compressor rotor
22 Compressor rotor shaft
23 Compressor rotor blade train
23a Compressor rotor blade
25 Compressor casing
26 Compressor stator vane train
26a Compressor stator vane
30 Combustor
40 Turbine
41 Turbine rotor
42 Turbine rotor shaft
43 Turbine rotor blade train
43a Turbine rotor blade
45 Turbine casing
46 Turbine stator vane train
46a Turbine stator vane
49 Combustion gas flow path
50, 50x, 50y Stator vane
50a Second stator vane
51 Blade body
51a Second blade body
52 Leading edge portion
53 Trailing edge portion
54 Suction side of blade
55 Pressure side surface of blade
60i Inner shroud
60o, 60ox, 60oy Outer shroud
60oa Second outer shroud
61 Outer shroud main body
62f Leading end surface
62b Trailing end surface
63n Suction side end surface of blade
63p Pressure side end surface of blade
64i, 64ix, 64iy Cavity
64ia Second cavity
64o, 64ox Outer space
64oa Second outer space
64p Gas path surface
65o Peripheral wall
65f Leading peripheral wall
65b Trailing peripheral wall
65n Suction side peripheral wall of blade
65p Pressure side peripheral wall of blade
66 Recess
66a Second recess
67 Tubular portion
71 Trailing end passage
72 Connecting passage
73n Suction side passage of blade
73p Pressure side passage of blade
75 Blade air passage
76 Blade surface ejection passage
77 Blade air tubular portion
81, 81x, 81y Impingement plate
81a Second impingement plate
82 Pressure-side side of blade
83 Leading-side side of blade
88, 88x Through hole
88a Second through hole
89 Communication hole
91, 91x, 91y First region
92, 92x, 92y Second region
100 Probe
101 Plug
A Air
Ac Cooling air
Ar Axis
F Fuel
G Combustion gas
GEN Generator
Dc Circumferential direction (lateral direction)
Dcp Circumferential pressure side of blade
Dcn Circumferential suction side of blade
Da Axial direction
Dau Axially upstream side
Dad Axially downstream side
Dr Radial direction
Dri Radially inner side
Dro Radially outer side
Dh Blade height direction
Dh1 First side
Dh2 Second side

The invention claimed is:

1. A gas turbine stator vane comprising:
a blade body forming a blade profile;
a shroud provided on a first side out of the first side and a second side of the blade body in a blade height direction; and
an impingement plate that forms a cavity with the shroud,
wherein the shroud has a recess which is recessed toward the second side and the recess of which the first side opens,
wherein the impingement plate is provided in an opening of the recess to form the cavity inside the recess,
wherein, in the impingement plate, a plurality of through holes which penetrate the impingement plate in the blade height direction and through which an outer space that is a space on the first side and the cavity with the impingement plate as a reference communicate with each other are formed,
wherein, in the impingement plate and the shroud, a communication hole which penetrates the impingement plate and the shroud in the blade height direction and through which an inner space that is a space on the second side and the outer space with the shroud as a reference communicate with each other is formed,
wherein a first region in which an opening ratio that is an opening area of the plurality of through holes per unit area is small and a second region in which the opening ratio is larger than that in the first region exist in a surface of the impingement plate, and
wherein, in the impingement plate, the second region is formed on a periphery of an opening of the communication hole in the impingement plate.

2. The gas turbine stator vane according to claim 1, wherein the number of the plurality of through holes included in the second region per unit area is larger than the number of the plurality of through holes included in the first region per unit area.

3. The gas turbine stator vane according to claim 1, wherein inner diameters of the plurality of through holes included in the second region are larger than inner diameters of the plurality of through holes included in the first region.

4. The gas turbine stator vane according to claim 1,
wherein the shroud has a tubular portion that extends from a bottom surface of the recess toward the first side,
wherein an end of the tubular portion on the first side is connected to the impingement plate, and
wherein an internal space of the tubular portion forms part of an internal space of the communication hole.

5. A gas turbine comprising:
the gas turbine stator vane according to claim 1;
a rotor that is configured to rotate about an axis;
a casing that covers an outer peripheral side of the rotor; and
a combustor that is configured to burn fuel to generate a combustion gas and send the combustion gas to the casing,
wherein the gas turbine stator vane is fixed to the casing in the casing such that the blade height direction faces in a radial direction with respect to the axis and the first side is a radially outer side with respect to the axis.

6. A gas turbine comprising:
a plurality of gas turbine stator vanes;
a rotor that is configured to rotate about an axis;
a casing that covers an outer peripheral side of the rotor; and
a combustor that is configured to burn fuel to generate a combustion gas and send the combustion gas to the casing,
wherein each of the plurality of gas turbine stator vanes has a blade body forming a blade profile, a shroud provided on a first side out of the first side and a second side of the blade body in a blade height direction, and an impingement plate that forms a cavity with the shroud,
wherein the plurality of gas turbine stator vanes are arranged in a circumferential direction with respect to the axis,
wherein each of the plurality of gas turbine stator vanes is fixed to the casing inside the casing such that the blade height direction faces in a radial direction with respect to the axis and the first side is a radially outer side with respect to the axis,
wherein, out of two adjacent gas turbine stator vanes in the circumferential direction, a first gas turbine stator vane which is one gas turbine stator vane is the gas turbine stator vane according to claim 1,
wherein, out of the two gas turbine stator vanes, a second shroud which is the shroud of a second gas turbine stator vane which is the other gas turbine stator vane has a second recess which is recessed toward a radially inner side with respect to the axis and the second recess of which a radially outer side with respect to the axis opens,
wherein a second impingement plate which is the impingement plate of the second gas turbine stator vane is provided in an opening of the second recess to form a second cavity which is the cavity inside the second recess,
wherein, in the second impingement plate, a plurality of through holes which penetrate the second impingement plate in the blade height direction and through which an outer space that is a space on the first side and the second cavity with the second impingement plate as a reference communicate with each other are formed, and wherein, in the second impingement plate and the second shroud, the communication hole of the first gas turbine stator vane is not formed.

7. The gas turbine according to claim 6,
wherein inner diameters of the plurality of through holes included in the second region are larger than inner diameters of the plurality of through holes included in the first region, and
wherein a distance between opening centers of two adjacent through holes in the first region is the same as a distance between opening centers of two adjacent through holes in the second region.

8. A gas turbine stator vane comprising:
a blade body forming a blade profile;
a shroud provided on a first side out of the first side and a second side of the blade body in a blade height direction; and
an impingement plate that forms a cavity with the shroud,
wherein the shroud has a recess which is recessed toward the second side and the recess of which the first side opens,
wherein the impingement plate is provided in an opening of the recess to form the cavity inside the recess,
wherein, in the impingement plate, a plurality of through holes which penetrate the impingement plate in the blade height direction and through which an outer space that is a space on the first side and the cavity with the impingement plate as a reference communicate with each other are formed,
wherein, in the impingement plate and the shroud, a communication hole which penetrates the impingement plate and the shroud in the blade height direction and through which an inner space that is a space on the second side and the outer space with the shroud as a reference communicate with each other is formed,
wherein a first region in which an opening ratio that is an opening area of the plurality of through holes per unit area is small and a second region in which the opening ratio is larger than that in the first region exist in a surface of the impingement plate,
wherein inner diameters of the plurality of through holes included in the second region are larger than inner diameters of the plurality of through holes included in the first region,
wherein a distance between opening centers of two adjacent through holes in the first region is the same as a distance between opening centers of two adjacent through holes in the second region, and
wherein, in the impingement plate, the second region is formed on a periphery of an opening of the communication hole in the impingement plate.

9. The gas turbine stator vane according to claim 8,
wherein the shroud has a tubular portion that extends from a bottom surface of the recess toward the first side,
wherein an end of the tubular portion on the first side is connected to the impingement plate, and
wherein an internal space of the tubular portion forms part of an internal space of the communication hole.

10. A gas turbine comprising:
a plurality of gas turbine stator vanes;
a rotor that is configured to rotate about an axis;
a casing that covers an outer peripheral side of the rotor; and
a combustor that is configured to burn fuel to generate a combustion gas and send the combustion gas to the casing, wherein each of the plurality of gas turbine stator vanes has a blade body forming a blade profile, a shroud provided on a first side out of the first side and a second side of the blade body in a blade height direction, and an impingement plate that forms a cavity with the shroud, wherein the plurality of gas turbine stator vanes are arranged in a circumferential direction with respect to the axis, wherein each of the plurality of gas turbine stator vanes is fixed to the casing inside the casing such that the blade height direction faces in a radial direction with respect to the axis and the first side is a radially outer side with respect to the axis, wherein, out of two adjacent gas turbine stator vanes in the circumferential direction, a first gas turbine stator vane which is one gas turbine stator vane is a gas turbine stator vane in which a first shroud which is the shroud has a first recess which is recessed toward the second side and the first recess of which the first side opens, a first impingement plate which is the impingement plate is provided in an opening of the first recess to form the cavity inside the first recess, in the first impingement plate, a plurality of through holes which penetrate the first impingement plate in the blade height direction and through which an outer space that is a space on the first side and the cavity with the first impingement plate as a reference communicate with each other are formed, in the first impingement plate and the first shroud, a communication hole which penetrates the first impingement plate and the first shroud in the blade height direction and through which an inner space that is a space on the second side and the outer space with the first shroud as a reference communicate with each other is formed, and a first region in which an opening ratio that is an opening area of the plurality of through holes per unit area is small and a second region in which the opening ratio is larger than that in the first region exist in a surface of the first impingement plate, and wherein, out of the two gas turbine stator vanes, a second gas turbine stator vane which is the other gas turbine stator vane is a gas turbine stator vane in which the second shroud which is the shroud of the second gas turbine stator vane is adjacent to the first shroud in the circumferential direction, a second shroud has a second recess which is recessed toward a radially inner side with respect to the axis, the second recess of which a radially outer side with respect to the axis opens, and the second recess which is adjacent to the first recess in the circumferential direction, a second impingement plate which is the impingement plate of the second gas turbine stator vane is provided in an opening of the second recess to form a second cavity which is the cavity inside the second recess, in the second impingement plate, a plurality of through holes which penetrate the second impingement plate in the blade height direction and through which an outer space that is a space on the first side and the second cavity with the second impingement plate as a reference communicate with each other are formed, in the second impingement plate and the second shroud, the communication hole of the first gas turbine stator vane is not formed, and in the second impingement plate, a region corresponding to the second region in the first gas turbine stator vane does not exist.

11. The gas turbine according to claim 10, wherein the number of the plurality of through holes included in the second region per unit area is larger than the number of the plurality of through holes included in the first region per unit area.

12. The gas turbine according to claim 10, wherein inner diameters of the plurality of through holes included in the second region are larger than inner diameters of the plurality of through holes included in the first region.

13. The gas turbine according to claim 10,
wherein the first shroud has a tubular portion that extends from a bottom surface of the recess toward the first side,
wherein an end of the tubular portion on the first side is connected to the first impingement plate, and
wherein an internal space of the tubular portion forms part of an internal space of the communication hole.

14. A method of manufacturing a gas turbine stator vane by executing:
a blade main body designing step of designing a blade main body that has a blade body forming a blade profile and a shroud provided on a first side out of the first side and a second side of the blade body in a blade height direction;
an impingement plate designing step of designing an impingement plate that forms a cavity with the shroud;
a manufacturing step of manufacturing the blade main body designed in the blade main body designing step and the impingement plate designed in the impingement plate designing step; and
an assembling step of assembling the impingement plate to the blade main body manufactured in the manufacturing step,
wherein the shroud designed in the blade main body designing step has a recess which is recessed toward the second side and the recess of which the first side opens,
wherein the impingement plate designed in the impingement plate designing step is provided in an opening of the recess to form the cavity inside the recess,
wherein the impingement plate designing step includes
a first disposition determining step of determining the disposition of a plurality of through holes which penetrate the impingement plate in the blade height direction and through which an outer space that is a space on the first side and the cavity with the impingement plate as a reference communicate with each other,
a second disposition determining step of determining the disposition of a communication hole which penetrates the impingement plate and the shroud in the blade height direction and through which an inner space that is a space on the second side and the outer space with the shroud as a reference communicate with each other, and
an inner diameter determining step of determining inner diameters of a plurality of first through holes which are the plurality of through holes included in a first region in a surface of the impingement plate and determining inner diameters of a plurality of second through holes which are the plurality of through holes included in a second region in the surface of the impingement plate except for the first region such that the inner diameters of the plurality of second through holes are larger than the inner diameters of the plurality of first through holes, and wherein, in the first disposition determining step, the second region is formed on a periphery of an opening of the communication hole in the impingement plate.

15. The method of manufacturing a gas turbine stator vane according to claim 14, wherein, in the first disposition determining step, a distance between opening centers of two adjacent through holes in the first region is made the same as a distance between opening centers of two adjacent through holes in the second region.

\* \* \* \* \*